US012464351B2

(12) United States Patent
Mayalil et al.

(10) Patent No.: US 12,464,351 B2
(45) Date of Patent: Nov. 4, 2025

(54) TECHNIQUES FOR MANAGING COMMUNICATION WITH WIRELESS DEVICES FLAGGED FOR CERTAIN ACTIVITY

(71) Applicant: Apple Inc., Cupertino, CA (US)

(72) Inventors: Stanley M. Mayalil, San Jose, CA (US); Hyewon Lee, Cupertino, CA (US); Pinki Gyanchandani, Cupertino, CA (US); Rajeev Verma, San Jose, CA (US); Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 575 days.

(21) Appl. No.: 17/932,268

(22) Filed: Sep. 14, 2022

(65) Prior Publication Data

US 2024/0089732 A1    Mar. 14, 2024

(51) Int. Cl.
*H04W 12/06* (2021.01)
*H04W 8/18* (2009.01)

(52) U.S. Cl.
CPC ............. *H04W 12/06* (2013.01); *H04W 8/18* (2013.01)

(58) Field of Classification Search
CPC ....... H04W 12/06; H04W 8/18; H04W 8/205; H04W 4/60; H04W 12/082; H04W 12/126; H04W 12/30; H04L 9/3247; H04L 63/10; H04L 67/303
See application file for complete search history.

(56) References Cited

U.S. PATENT DOCUMENTS 10,764,746 B1 *   9/2020  Dreiling ................. H04W 8/26
11,146,948 B1 *  10/2021  Uehling ............... H04W 12/30
11,323,877 B1 *   5/2022  Verma .................. H04W 12/06
(Continued)

FOREIGN PATENT DOCUMENTS

EP       3606119 A1 *  2/2020  ............ H04W 8/183

OTHER PUBLICATIONS

International Patent Application No. PCT/US2023/029088—International Search Report and Written Opinion dated Jan. 4, 2024.

*Primary Examiner* — Brandon J Miller
(74) *Attorney, Agent, or Firm* — DICKINSON WRIGHT RLLP

(57) ABSTRACT

This Application sets forth techniques for managing communication with wireless devices that have been flagged due to certain activity. In particular, the techniques effectively eliminate unnecessary interactions and enable enhanced user feedback when wireless devices that have been flagged are attempting to interact with mobile network operators (MNOs). The techniques can be implemented by a variety of entities to achieve different and efficient results under various scenarios. Such entities can include, for example, i) equipment identity registries that track unique identifiers of wireless devices that have been flagged due to certain activity, ii) MNO servers, such as SM-DP+ servers, and iii) wireless devices. Additionally, individual components within wireless devices can implement the techniques variously, including using issuer security domain root (ISD-R) components, local profile assistants (LPAs), electronic subscriber identity module (eSIM) components, and/or baseband components included in the wireless devices.

19 Claims, 7 Drawing Sheets

(56) References Cited

U.S. PATENT DOCUMENTS

| | | | |
|---|---|---|---|
| 2009/0093235 A1* | 4/2009 | Grealish | G06F 21/88 |
| | | | 455/411 |
| 2015/0067351 A1 | 3/2015 | Wang et al. | |
| 2018/0060199 A1 | 3/2018 | Li et al. | |
| 2019/0082320 A1* | 3/2019 | Avasarala | H04L 63/0876 |
| 2019/0182659 A1 | 6/2019 | Ahmed et al. | |
| 2021/0084490 A1* | 3/2021 | Chikkala | H04W 12/033 |

* cited by examiner

TECHNIQUES FOR MANAGING COMMUNICATION WITH WIRELESS DEVICES FLAGGED FOR CERTAIN ACTIVITY

FIELD

The described embodiments set forth techniques for managing communication with wireless devices that have been flagged due to certain activity. In particular, the techniques effectively eliminate unnecessary interactions and enable enhanced user feedback when wireless devices that have been flagged for certain activity are attempting to interact with mobile network operators (MNOs).

BACKGROUND

Many wireless devices are configured to use removable Universal Integrated Circuit Cards (UICCs) that enable the wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as a subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIM (eSIM) profiles on the eUICC, where the eSIM profiles can provide for new and/or different services and/or updates for accessing extended features provided by MNOs. In this regard, an eUICC can beneficially eliminate the need to include UICC-receiving bays in wireless devices.

In some cases, an MNO can determine, when interacting with a wireless device, that the wireless device has been flagged due to certain activity. Exemplary certain activity can include, for example, the MNO identifying that two or more devices share a unique identifier and have attempted to interact with the MNO, the MNO receiving (e.g., from a customer or other entity) a notification that a particular wireless device has been lost or misappropriated, and the like. When the MNO determines that it is communicating with a flagged wireless device, the MNO typically abandons interacting with the wireless device. Unfortunately, communication is well underway before such abandonment occurs, which constitutes a series of drawbacks. For example, provisioning an eSIM profile to a wireless device includes multiple stages to complete, including operations that occur at the wireless device on which the eSIM profile is to be installed, at manufacturer servers that manage the wireless device, and at MNO servers from which the eSIM profile is downloaded and activated for service. In this regard, abandoning a partially completed eSIM profile provisioning process can be wasteful in relation to both power and network bandwidth consumption. Moreover, no mechanisms exist for the MNO to inform a wireless device that it has been flagged, thereby leaving the wireless device incapable of determining why further communication with the MNO is being denied. This can be frustrating for innocent, unassuming users of flagged wireless devices that are left with no indication of the nature of the issue.

In view of the foregoing considerations, there exists a need for a technique that effectively eliminates unnecessary interactions and enables enhanced user feedback when wireless devices that have been flagged for certain activity are attempting to communicate with an MNO.

SUMMARY

This Application sets forth techniques for managing communication with wireless devices that have been flagged due to certain activity. In particular, the techniques effectively eliminate unnecessary interactions and enable enhanced user feedback when wireless devices that have been flagged are attempting to interact with mobile network operators (MNOs).

One embodiment sets forth a method for interacting with a wireless device that has been flagged due to certain activity. According to some embodiments, the method is implemented primarily by a provisioning server, e.g., a subscription manager—data preparation (SM-DP+) server, and includes: (1) receiving, from a local profile assistant (LPA) of the wireless device, a client authentication request, where the client authentication request includes at least one unique identifier associated with the wireless device, (2) providing the at least one unique identifier to an equipment identity registry, where the equipment identity registry manages unique identifiers of wireless devices that have been flagged due to certain activity, (3) receiving, from the equipment identity registry, a status of the wireless device, where the status indicates that the wireless device has been flagged due to certain activity, and (4) providing the status of the wireless device to the LPA.

Another embodiment sets forth a method for interacting with a wireless device that has been flagged due to certain activity. According to some embodiments, the method is implemented primarily by a local profile assistant (LPA) of the wireless device, and includes: (1) obtaining at least one unique identifier associated with the wireless device, (2) providing the at least one unique identifier to an equipment identity registry, where the equipment identity registry manages unique identifiers of devices that have been flagged due to certain activity, and (3) in response to receiving, from the equipment identity registry, a status of the wireless device, where the status indicates that the wireless device has been flagged due to certain activity, updating a configuration of the wireless device so that the wireless device is prohibited from performing at least one form of cellular wireless network activity.

Yet another embodiment sets forth a method for interacting with a wireless device that has been flagged due to certain activity. According to some embodiments, the method is implemented primarily by an embedded Universal Integrated Circuit Card (eUICC) of the wireless device, and includes: (1) receiving, from a baseband component of the wireless device, a network attach failure notification, (2) providing, to an issuer security domain root (ISD-R) component of the wireless device, a request to suspend profile-related activities on the wireless device, and (3) updating a configuration of the wireless device so that the wireless device is prohibited from performing the profile-related activities.

Other embodiments include a non-transitory computer readable medium configured to store instructions that, when executed by a processor included in a computing device, cause the computing device to implement the methods and techniques described in this disclosure. Yet other embodiments include hardware computing devices that include processors that can be configured to cause the hardware computing devices to implement the methods and techniques described in this disclosure.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
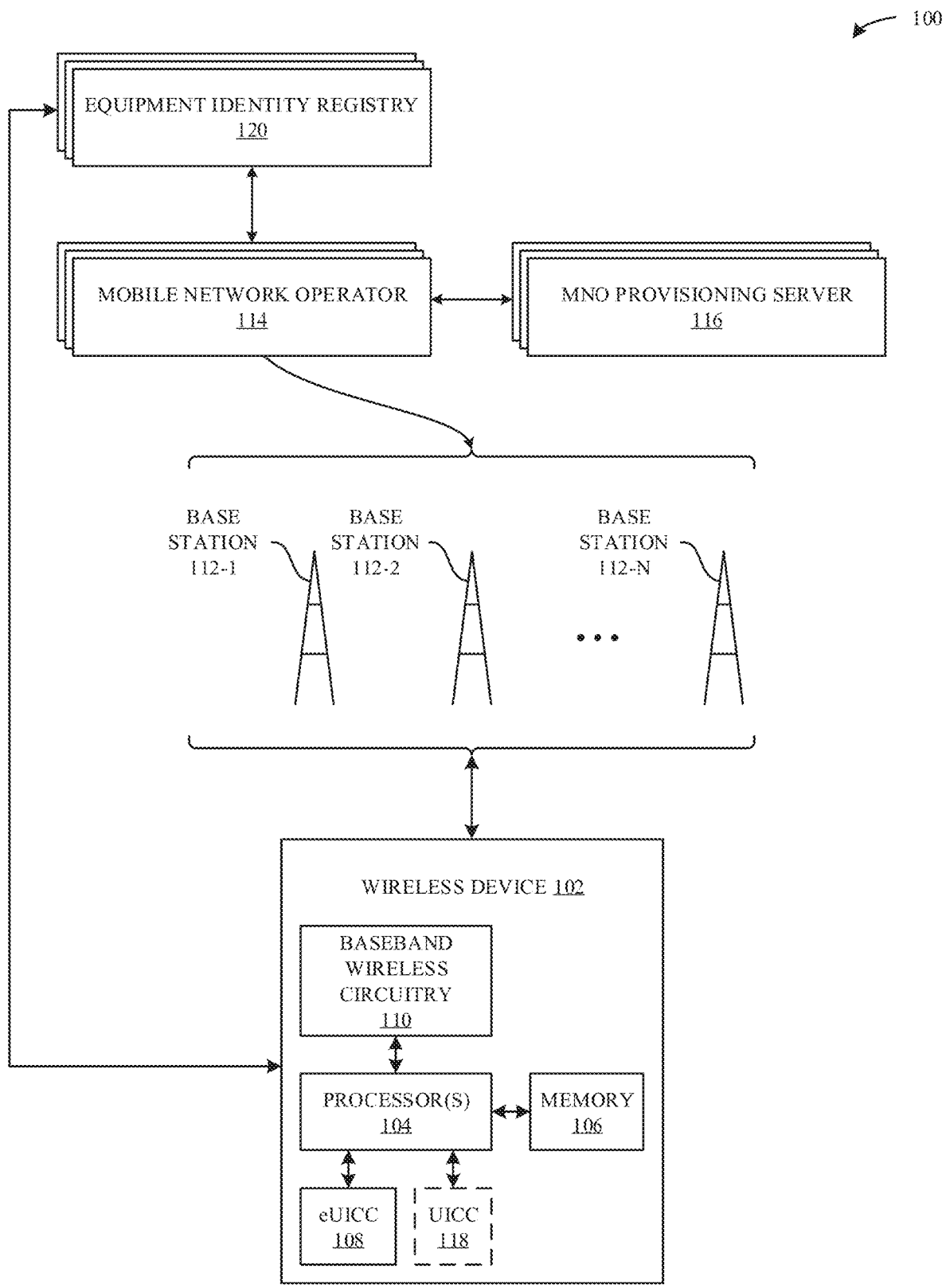
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description, and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for interacting with wireless devices that have been flagged due to certain activity. In particular, the techniques effectively eliminate unnecessary interactions and enable enhanced user feedback when wireless devices that have been flagged are attempting to interact with mobile network operators (MNOs).

A first technique can primarily be implemented by a mobile network operator (MNO) provisioning server (e.g., an SM-DP+ server) that interacts with wireless devices and equipment identity registries. According to some embodiments, an equipment identity registry is an entity that manages a database of identifiers associated with wireless devices that have been flagged due to certain activity. Additionally, entities internal to the wireless device can be involved in the technique, including a local profile assistant (LPA) configured to interface with the SM-DP+ server and an issuer security domain root (ISD-R).

Under the first technique, an initial step can involve a trigger operation taking place on the wireless device, such as the wireless device being powered on, a user attempting to cause the wireless device to perform an electronic subscriber identity module (eSIM) profile related activity, and the like. In turn, the LPA can gather wireless device information (e.g., one or more unique identifiers) associated with the wireless device and provide such information to the ISD-R. Next, the ISD-R can digitally sign the wireless device information and provide it to the LPA. In turn, the LPA can issue a client authentication request to the SM-DP+ server, where the request includes the signed wireless device information. According to some embodiments, the communications between the LPA and the SM-DP+ server can take place using an ES9+ interface defined by the GSM Association (GSMA), which can be used to provide a secure communication channel between the SM-DP+ server and the LPA. However, any approach can be used to enable the LPA and the SM-DP+ to communicate information between one another without departing from the scope of this disclosure.

Next, the SM-DP+ server issues a query to an equipment identity registry, where the query includes wireless device information received by the SM-DP+ server from the LPA. The query issued by the SM-DP+ server can include any additional information that may assist the equipment identity registry in determining whether it should report back that the wireless device has been flagged as a device of concern. In turn, the equipment identity registry determines, using the information received from the SM-DP+ server, whether the wireless device has been flagged as a device of concern, and subsequently issues a client authentication response to the LPA. The client authentication can include any information that effectively informs the LPA of whether the wireless device has been identified as a device of concern.

Next, the wireless device can provide feedback, e.g., through a display device that is communicably attached to the wireless device, when the wireless device has been flagged due to certain activity. According to some embodiments, the wireless device can display information indicating the nature of the reason that the wireless device is prohibited from further-interacting with the SM-DP+ server.

A second technique can primarily be implemented by a wireless device-particularly, an LPA included in the wireless device. Under this approach, the LPA can interact with a baseband component instead of the ISD-R discussed above in conjunction with the first technique. Moreover, the LPA can interact with equipment identity registries instead of interfacing with an SM-DP+ server. In this regard, and according to some embodiments, the LPA can communicate with an equipment identity registry (and vice versa) using any conceivable connectivity techniques, e.g., using a Wi-Fi connection with access to the Internet, using a cellular data connection provided by an MNO, and so on.

According to some embodiments, the second technique can begin when some form of activity takes place at the wireless device. The activity can include, for example, an initial power-on of the wireless device (and, by extension, an initial power-on of the LPA and the baseband). In another example, the activity can include the wireless device transitioning out of an airplane mode (or equivalent) such that the components within the wireless device are re-initializing into an operating state. In turn, two different sub-approaches can be implemented depending on device capabilities, procedural preferences, and the like.

According to some embodiments, a first sub-approach involves the LPA issuing, to an equipment identity registry, wireless device information associated with the wireless device. As discussed above, such information can include any conceivable information that effectively enables the equipment identity registry to determine whether the wireless device (or some component thereof) has been flagged due to certain activity. In turn, the equipment identity registry can identify, based on the information, whether the wireless device (or some component thereof) has been flagged due to certain activity. Under any approach used, the equipment identity registry ultimately returns, to the LPA, a status message that indicates whether the wireless device, at least according to the equipment identity registry, is a device of concern.

Alternatively, a second sub-approach involves the baseband experiencing a network attach failure. This can occur, for example, when the MNO to which the wireless device is attempting to attach determines that the wireless device has been flagged and refuses to allow the attachment to proceed. Such a scenario typically involves the MNO receiving, from the baseband, a request to attach, where the request includes at least one identifier associated with the wireless device. In turn, the MNO can effectively determine whether the wireless device has been flagged due to certain activity, e.g., by referencing its own internal management system, by interfacing with equipment identity registries, and so on. In any case, the baseband—in response to detecting the network attach failure—can inform the LPA that the wireless device has been flagged for certain activity.

Accordingly—and, regardless of the sub-approach that is utilized—the LPA is ultimately informed that the MNO (to which the wireless device is attempting to interface) has identified that the wireless device has been flagged and therefore will not be permitted to access wireless services provided by the MNO.

In turn, the LPA can update any configuration(s) of the wireless device to effectively prevent the wireless device from attempting to perform any number of activities that would be wasteful given the wireless device has been flagged. For example, the wireless device can be configured to not make any additional attempts to attach to MNOs, to prohibit eSIM profile-based activities, and the like.

Next, when a trigger operation is detected by the LPA-which occurs when activity takes place on the wireless device that violates the configuration update that took place—the wireless device can provide feedback, e.g., through a display device that is communicably attached to the wireless device. In some cases, the feedback approach can provide one or more options that permit a user to effectively bypass the configuration update implemented by the wireless device, which can be particularly useful if a user believes the flagged status of the wireless device has been removed.

A third technique can primarily be implemented by a wireless device-particularly, an eUICC included in the wireless device, which can include an ISD-R and an eSIM profile. Under this approach, the eUICC can interact with a baseband component as well as an LPA of the wireless device. As with the above-described techniques, the third technique can be invoked in response to some form of activity taking place at the wireless device. In turn, two different sub-approaches can be implemented depending on device capabilities, procedural preferences, and the like.

According to some embodiments, a first sub-approach involves the eSIM profile issuing a request to the baseband to receive one or more notifications when the baseband experiences a network attach failure (which, as described above, can occur when the wireless device is prohibited from accessing wireless services provided by an MNO in conjunction with identifying that the wireless device has been flagged due to certain activity). In turn, if/when the baseband detects a network attach failure, the baseband provides, to the eSIM profile, a notification of the network attach failure. At this juncture, the eSIM profile is aware that the network attach failure has occurred (and that the wireless device has been flagged). Accordingly, the eSIM profile can interface with the ISD-R to cause the ISD-R to perform a configuration update that effectively prevents the wireless device from attempting to perform any number of activities that would be wasteful given the wireless device has been flagged. This can include, for example, a request to suspend profile-related activities on the wireless device until at least one condition is satisfied.

Alternatively, a second sub-approach omits the eSIM profile registering to receive a network attach failure notification from the baseband (as described above in the first sub-approach). Instead, the baseband can be configured (e.g., in advance) to notify the ISD-R of any network attach failures that the baseband experiences. This approach can be useful, for example, when the wireless device is not in possession of any eSIM profiles and is attempting to interface with an MNO (or other entity) to download an eSIM profile to access wireless services. In any case, when the baseband is aware that a network attach failure has occurred (and that the wireless device has been flagged), the baseband can interface with the ISD-R. In particular, the baseband can cause the ISD-R to perform the same or similar configuration updates described above in conjunction with the first sub-approach.

Accordingly—and, regardless of the sub-approach that is utilized—the ISD-R is ultimately informed that the MNO (to which the wireless device is attempting to interface) has identified that the wireless device has been flagged and therefore will refuse to provide wireless services to the wireless device. In turn, the ISD-R can update any configuration(s) of the wireless device to effectively prevent the wireless device from attempting to perform any number of activities (such as those described herein) that would be wasteful given the wireless device has been flagged. Additionally, it is noted that other entities (aside from the ISD-R) included within the wireless device can perform the configuration updates without departing from the scope of this disclosure.

Next, one or more trigger operations may take place on at the wireless device that attempt to violate the aforementioned configuration updates, such as those described above in conjunction with the first and second techniques. In response, the LPA can issue a request to the ISD-R for information associated with the eUICC and/or a challenge-based response from the eUICC. According to some embodiments, the request for information associated with the eUICC can be facilitated using ES10b functions defined by the GSM Association (GSMA), but it is noted that any protocol(s) may be utilized to enable the LPA and the ISD-R to communicate with one another without departing from the scope of this disclosure. In turn, the ISD-R can indicate to the LPA that the configuration update effected a suspension of profile-related activities on the wireless device until at least one condition is satisfied. Ultimately, the wireless device can provide feedback, e.g., through a display device that is communicably attached to the wireless device, in accordance with the techniques described herein.

It is noted that the first, second, and third techniques discussed above are not required to be implemented in isolation. On the contrary, any number of these approaches, in part or in whole, as well as alone or in combination, can be implemented to achieve desired results (with respect to managing wireless devices that have been flagged by the equipment identity registries) without departing from the scope of this disclosure. Additionally, it is noted that the configuration updates discussed herein, once applied, can be modified (or reversed) when one or more conditions are satisfied, the details of which are described below in greater detail.

These and other embodiments are discussed below with reference to FIGS. 1 to 7; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a wireless device 102, which can also be referred to as a device, a wireless device, a mobile device, a user equipment (UE) and the like, a group of base stations 112-1 to 112-N that are managed by different Mobile Network Operators (MNOs) 114, and a set of MNO provisioning servers 116 that are in communication with the MNOs 114. Additional MNO infrastructure servers, such as used for account management and billing are not shown. The wireless device 102 can represent a mobile computing device (e.g., an iPhone®, an iPad®, an Apple Watch by Apple®, etc.), the base stations 112-1 to 112-n can represent cellular wireless network entities including evolved NodeBs (eNodeBs or eNBs) and/or next generation NodeBs (gNodeBs or gNB) that are configured to communicate with the wireless device 102, and the MNOs 114 can represent different wireless service providers that provide specific cellular wireless services (e.g., voice and data) to which the wireless device 102 can subscribe, such as via a subscription account for a user of the wireless device 102.

As shown in FIG. 1, the wireless device 102 can include processing circuitry, which can include one or more processor(s) 104 and a memory 106, at least one embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the wireless device 102 includes one or more physical UICCs 118, also referred to as Subscriber Identity Module (SIM) cards, in addition to or substituting for the eUICC 108. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can be configured to store multiple electronic SIM (eSIM) profiles for accessing cellular wireless services provided by different MNOs 114 by connecting to their respective cellular wireless networks through base stations 112-1 to 112-N. For example, the eUICC 108 can be configured to store and manage one or more eSIM profiles for one or more MNOs 114 for different subscriptions to which the wireless device 102 is associated. To be able to access services provided by an MNO, an eSIM profile can be reserved for subsequent download and installation to the eUICC 108. In some embodiments, the eUICC 108 obtains one or more eSIM profiles from one or more associated MNO provisioning servers 116. The MNO provisioning servers 116 can be maintained by the MNOs 114, an OEM manufacturer, third party entities, and the like. Communication of eSIM profile data between an MNO provisioning server 116 and the eUICC 108 (or between the MNO provisioning server 116 and processing circuitry of the wireless device 102 external to the eUICC 108, e.g., the processor 104) can use a secure communication channel.

Additionally, and as shown in FIG. 1, the system 100 can include at least one equipment identity registry 120. According to some embodiments, the equipment identity registry 120 represents an entity that manages a database of identifiers associated with wireless devices 102 (e.g., international mobile equipment identity (IMEI) identifiers of wireless devices 102, identifiers (EIDs) of eUICCs 108 included in wireless devices 102, identifiers of physical SIM cards that are insertable into wireless devices 102, etc.) that have been flagged due to certain activity. Such activity can include, for example, an MNO 114 identifying that two or more wireless devices 102 sharing an identifier are attempting to access the MNO 114, which suggests that at least one of the two or more wireless devices 102 is attempting to spoof the identifier of another one of the two or more wireless devices 102. In another example, the MNO 114 (or some other entity) can report incidents of stolen wireless devices 102 to the equipment identity registry 120.

It is noted that the equipment identity registry 120 is not limited to managing information only about malicious activity associated with wireless devices 102. On the contrary, the equipment identity registry 120 can track wireless devices 102 based on other concerns, including wireless devices 102 that have been reported as lost, wireless devices 102 that have exhibited suspicious behavior, wireless devices 102 that are associated with flagged or delinquent service accounts, and so on. It is again noted that the foregoing examples are not meant to represent an exhaustive list and that any wireless device 102 can be tracked by the equipment identity registry 120 for any reason without departing from the scope of this disclosure.

Additionally, it is noted that the equipment identity registry 120 can store, in addition to the identifiers of the wireless devices 102, any additional information that represents the nature of the reason why the wireless devices 102 are being tracked by the equipment identity registry 120. For example, the equipment identity registry 120 can store, for a given wireless device 102, an indication of one or more foundational reasons as to why the equipment identity registry 120 is tracking the wireless device 102. Such an indication can include, for example, values that represent why the wireless device 102 was reported to the equipment identity registry 120 (or identified by the equipment identity registry 120) in the first place (e.g., one or more of the reasons discussed above), the amount of time that the wireless device 102 has been tracked by the equipment identity registry 120, the number of times the equipment identity registry 120 has tracked the wireless device 102, and so on. Such information can beneficially enable the equipment identity registry 120 to make informed decisions about if and when wireless devices 102 should no longer be tracked, particularly in the absence of instructions from the MNOs 114 or the knowledge of how to proceed after a wireless device 102 is initially reported to the equipment identity registry 120. Again, it is noted that the foregoing examples are not meant to represent an exhaustive list and that the equipment identity registry 120 can store any additional information in relation to the identifiers of the wireless devices 102 without departing from the scope of this disclosure.

Figure 2:
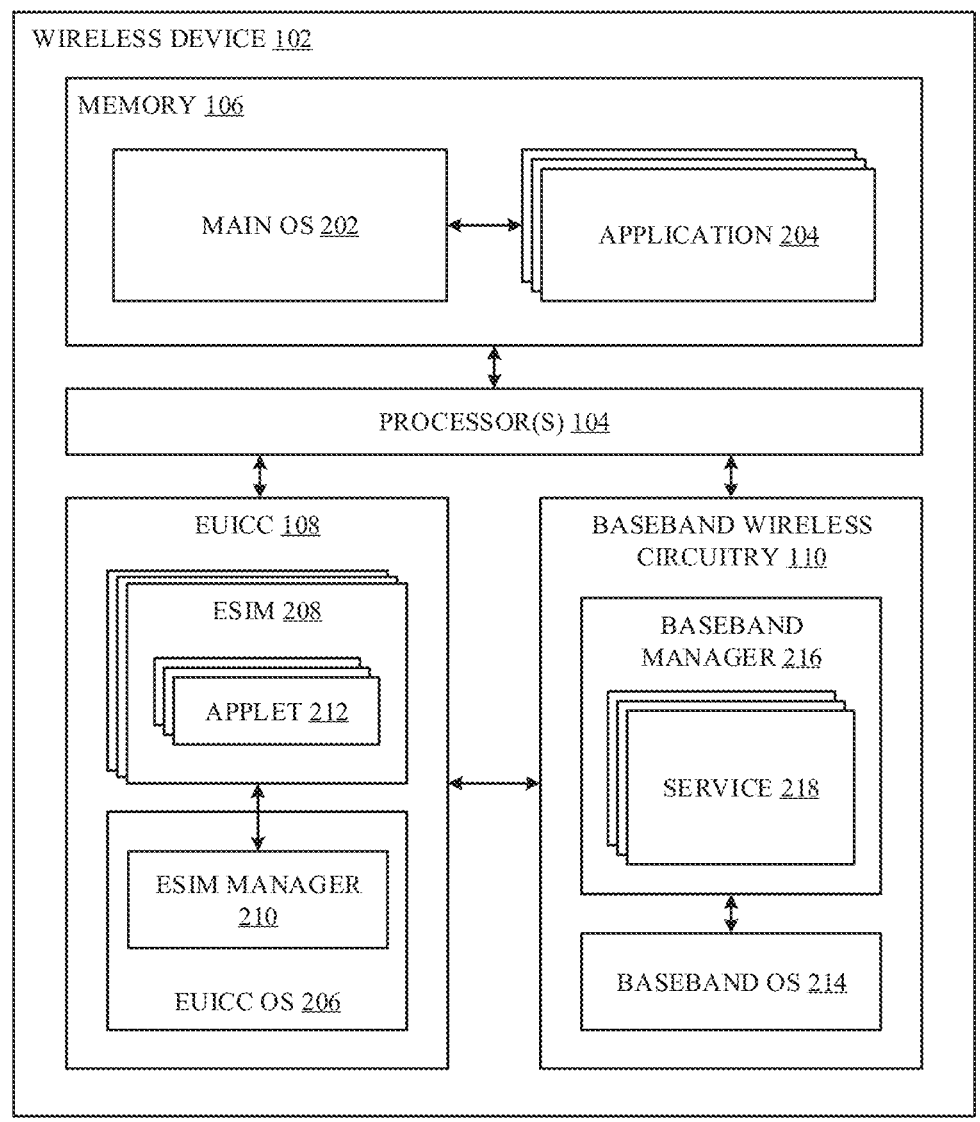
FIG. 2 illustrates a block diagram of a more detailed view of particular components of a wireless device illustrated in FIG. 1, according to some embodiments.

FIG. 2 illustrates a block diagram of a more detailed view 200 of particular components of the wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIM profiles 208 that are stored by the eUICC 108, e.g., by downloading, installing, deleting, enabling, disabling, modifying, or otherwise performing management of the eSIM profiles 208 within the eUICC 108 and to provide baseband wireless circuitry 110 with access to the eSIM profiles 208 to provide access to wireless services for the wireless device 102. The eUICC 108 OS can include an eSIM profile manager 210, which can perform management functions for various eSIM profiles 208. According to the illustration shown in FIG. 2, each eSIM profile 208 can include a number of applets 212 that define the manner in which the eSIM profile 208 operates. For example, one or more of the applets 212, when implemented in conjunction with baseband wireless circuitry 110 and the eUICC 108, can be configured to enable the wireless device 102 to communicate with an MNO 114 and provide useful features (e.g., phone calls and internet access) to a user of the wireless device 102.

As also shown in FIG. 2, the baseband wireless circuitry 110 of the wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM profile data) from the MNO provisioning server 116 for purposes of managing eSIM profiles 208. The baseband manager 216 can be configured to implement services 218, which represents a collection of software modules that are instantiated by way of the various applets 212 of enabled eSIM profiles 208 that are included in the eUICC 108. For example, services 218 can be configured to manage different connections between the wireless device 102 and MNOs 114 according to the different eSIM profiles 208 that are enabled within the eUICC 108.

Figure 3:
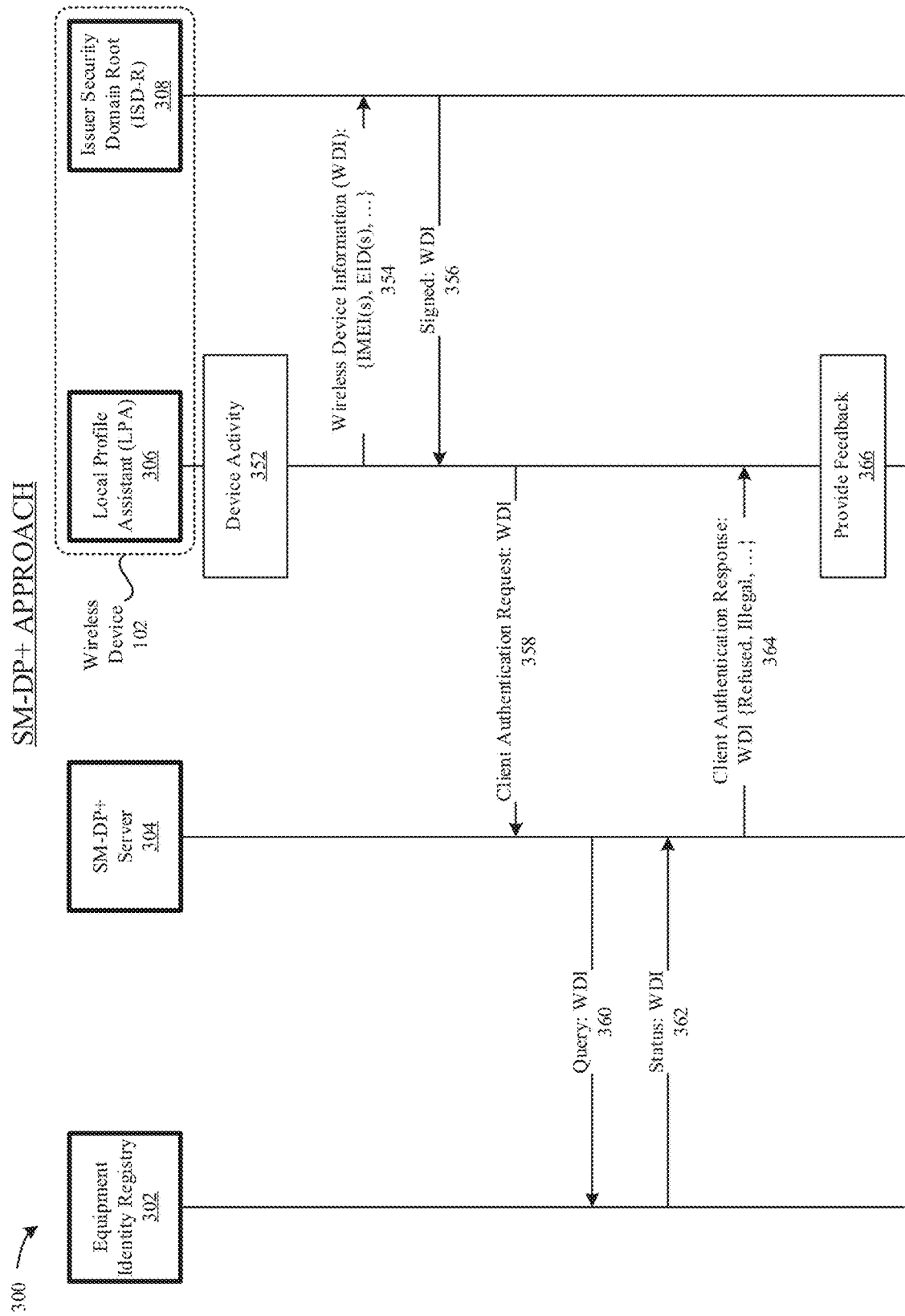
FIG. 3 illustrates a sequence diagram of a first (SM-DP+ centric) technique for interacting with a wireless device that has been flagged due to certain activity, according to some embodiments.

FIG. 3 illustrates a sequence diagram 300 of a first technique for interacting with a wireless device 102 that has been flagged due to certain activity, according to some embodiments. As shown in FIG. 3, the technique can primarily be implemented by an SM-DP+ server 304, which can represent, for example, one of the MNO provisioning servers 116 illustrated in FIG. 1 and described herein. Under this approach, the SM-DP+ server 304 can interact with wireless devices 102 and equipment identity registries 302 to perform the techniques described below in greater detail.

As shown in FIG. 3, the SM-DP+ server 304 can be configured to interact with an equipment identity registry 302, which can represent one of the equipment identity registries 120 illustrated in FIG. 1 and described herein. Additionally, entities internal to the wireless device 102 can be involved in the technique illustrated in FIG. 3. In particular, the entities can include a local profile assistant (LPA) 306, which can be configured to interface with the SM-DP+ server 304. According to some embodiments, the LPA 306 represents a functional element that provides local profile download functionality, local discovery service functionality, and local user interface features. Additionally, the entities can include an issuer security domain root (ISD-R) 308 that is configured to manage eSIM profiles on the wireless device 102, which can include, for example, an initial profile that can be used to establish network connectivity with the SM-DP+ server 304. The ISD-R 308 can also provide authentication techniques, such as those discussed below in greater detail in conjunction with step 356.

As shown in FIG. 3, an initial step 352 can involve any device activity taking place on the wireless device 102 that causes the sequence diagram 300 to be invoked. For example, the device activity can represent an end user powering-on the wireless device 102. In another example, the device activity can represent the wireless device 102 attempting to attach to an MNO in order to download an eSIM profile, access wireless services using an existing eSIM profile, and the like. It is noted that the foregoing examples are not intended to represent an exhaustive list, and that any activity that takes place on the wireless device 102 can constitute the device activity illustrated in FIG. 3 without departing from the scope of this disclosure.

Next, at step 354, the LPA 306 can gather wireless device information associated with the wireless device 102 and provide such information to the ISD-R 308. As shown in FIG. 3, the wireless device information can include, but is not limited to, one or more identifiers associated with the wireless device 102 itself (e.g., an international mobile equipment identity (IMEI)), one or more identifiers associated with components of the wireless device 102 (e.g., identifiers (EIDs) of eUICCs 108 included in the wireless device 102, identifiers of physical SIM cards inserted into the wireless device 102, etc.), and the like. It is noted that the foregoing examples are not intended to represent an exhaustive list, and that any identifiers associated with the wireless device 102 can be gathered and provided without departing from the scope of this disclosure.

Next, at step 356, the ISD-R 308 digitally signs the wireless device information. This can involve, for example, the ISD-R 308 accessing one or more cryptographic keys that are known to the ISD-R 308 and utilizing the keys to establish digital signatures that are based on (i.e., linked to) the wireless device information. According to some embodiments, the utilized cryptographic scheme can enable the SM-DP+ server 304 to reliably determine that the ISD-R 308 (and, by extension, the wireless device 102) is authentic and known to the SM-DP+ server 304. For example, if the ISD-R 308 establishes a digital signature using a private key that is unique and accessible to the ISD-R 308, then the SM-DP+ server 304 can utilize a counterpart public key that is accessible (and known) to the SM-DP+ server 304 to validate the digital signature. It is noted that the foregoing examples are not intended to represent an exhaustive list, and that any cryptographic scheme (or other authentication schemes) can be utilized to enable to the SM-DP+ server 304 to effectively identify that the wireless device 102 is authentic and known to the SM-DP+ server 304.

At step 358, the LPA 306 issues a client authentication request to the SM-DP+ server 304, where the request includes the signed wireless device information. According to some embodiments, the communications between the LPA 306 and the SM-DP+ server 304 can take place using the ES9+ interface defined by the GSM Association (GSMA), which can be used to provide a secure communication channel between the SM-DP+ server 304 and the LPA 306. When this protocol is used, the client authentication request illustrated in FIG. 3 can represent an ES9+.AuthenticateClient function. It is noted that the utilization of ES9+ in step 358—as well as step 364 discussed below—is one example approach that can be utilized and is not meant to be limiting. On the contrary, any approach can be utilized to enable the SM-DP+ server 304 and the LPA 306 to communicate information between one another without departing from the scope of this disclosure.

At step 360, the SM-DP+ server 304 issues a query to an equipment identity registry 302, where the query includes wireless device information received by the SM-DP+ server 304 from the LPA 306. According to some embodiments, the equipment identity registry 302 can represent one of the equipment identity registries 120 discussed above in conjunction with FIG. 1. As discussed herein, the query issued by the SM-DP+ server 304 can include any additional information that may assist the equipment identity registry 302 in determining whether it should report back that the wireless device 102 has been flagged as a device of concern.

At step 362, the equipment identity registry 302 determines, using the information received from the SM-DP+ server 304, whether the wireless device 102 has been flagged as a device of concern. According to some embodiments, and under a simple approach, the equipment identity registry 302 can return a Boolean value that indicates whether an entry for the wireless device 102 exists in a database accessible to the equipment identity registry 302 (thereby inherently indicating that the wireless device 102 is a device of concern). Under a more complex approach, the equipment identity registry 302 can analyze any information it has on the wireless device 102 or any additional information it may access through other entities to which the wireless device 102 is known—to effectively determine whether the wireless device 102 is a device of concern. Under any approach used, the equipment identity registry 302 ultimately returns, to the SM-DP+ server 304, a status message that indicates whether the wireless device 102 is a device of concern.

At step 364, the SM-DP+ server 304 issues a client authentication response to the LPA 306. According to some embodiments, and as described above, the communications between the SM-DP+ server 304 and the LPA 306 can take place using the ES9+ interface defined by the GSM Association (GSMA), which can be used to provide a secure communication channel between the SM-DP+ server 304 and the LPA 306. When this protocol is used, the client authentication response illustrated in FIG. 3 can represent an ES9+.AuthenticateClient function. Again, it is noted that the utilization of ES9+ in steps 358 and 364 is one example approach that can be utilized and is not meant to be limiting. On the contrary, any approach can be utilized to enable the SM-DP+ server 304 and the LPA 306 to communicate with one another without departing from the scope of this disclosure.

In any case, the client authentication response issued by the SM-DP+ server 304 can include any information that effectively informs the LPA 306 of whether the wireless device 102 has been identified as a device of concern. Presently, the GMSA standard is deficient with regard to status codes that can be used to convey the many reasons that a wireless device 102 has been designated as a device of concern (e.g., duplicated identifier, stolen, lost, business reasons, temporal reasons, etc.). Accordingly, this deficiency can be remedied by supplementing the GMSA standard with a number of status codes commensurate to represent the foregoing additional information and the desired level of granularity by which it should be reported to the LPA 306. It is noted that the foregoing examples are not meant to be limiting, and that the SM-DP+ server 304 and the LPA 306 can implement any reasonable approach for effectively communicating whether the wireless device 102 is a device of concern without departing from the scope of this disclosure, including approaches that do not rely on the GMSA standard.

Additionally, it is noted that the SM-DP+ server 304 can be configured to provide any number of status codes necessary to accurately convey the nature of the issue (if any) to the wireless device 102. For example, one or more status codes can be utilized to indicate that the IMEI of the wireless device 102 is valid but that its EID has been flagged by the equipment identity registry 302. In another example, one or more status codes can be utilized to indicate that one or more aspects of a wireless device 102 having two or more IMEIs/EIDs/etc. (e.g., a dual SIM device) have been flagged. For example, the status code could indicate that one of the IMEIs/EIDs/etc. is valid, but that the other(s) is/are not. It is noted that the foregoing examples are not meant to be limiting, and that any information in any format can be transmitted between the SM-DP+ server 304 and the wireless devices 102 in a manner that enables the wireless devices 102 to acquire a detailed understanding of the nature of the issue.

At step 366, the wireless device 102 can provide feedback, e.g., through a display device that is communicably attached to the wireless device 102. According to some embodiments, the wireless device 102 can display information indicating the nature of why the wireless device 102 is prohibited from further-interacting with the SM-DP+ server 304. It is noted that any approach can be utilized to maximize a user's understanding of the nature of the problem. This can include, for example, the wireless device 102 displaying information with suggestions about how to remedy the issue. This can be particularly useful for unassuming/innocent individuals who possess the credentials to effectively remove the wireless device 102 as a device of concern from the perspective of the equipment identity registry 302. This can also warn nefarious users that their actions have been identified and that the wireless devices 102 will be unable to attach to the network, which may beneficially cause such users to abandon the wireless devices 102. Additionally, under particular scenarios (such as spoofed devices or devices reported as stolen), the wireless device 102 can warn the user that additional information has been reported to relevant authorities and that the wireless device should be promptly returned to an authorized location. It is noted that the foregoing examples do not represent an exhaustive list, and that the wireless device 102 can take any conceivable course of action after it is has received the information from the SM-DP+ server 304, without departing from the scope of this disclosure.

Accordingly, FIG. 3 sets forth an SM-DP+ server-centric approach for eliminating unnecessary interactions and enabling enhanced user feedback when wireless devices that have been flagged are attempting to interact with MNOs.

Figure 4:
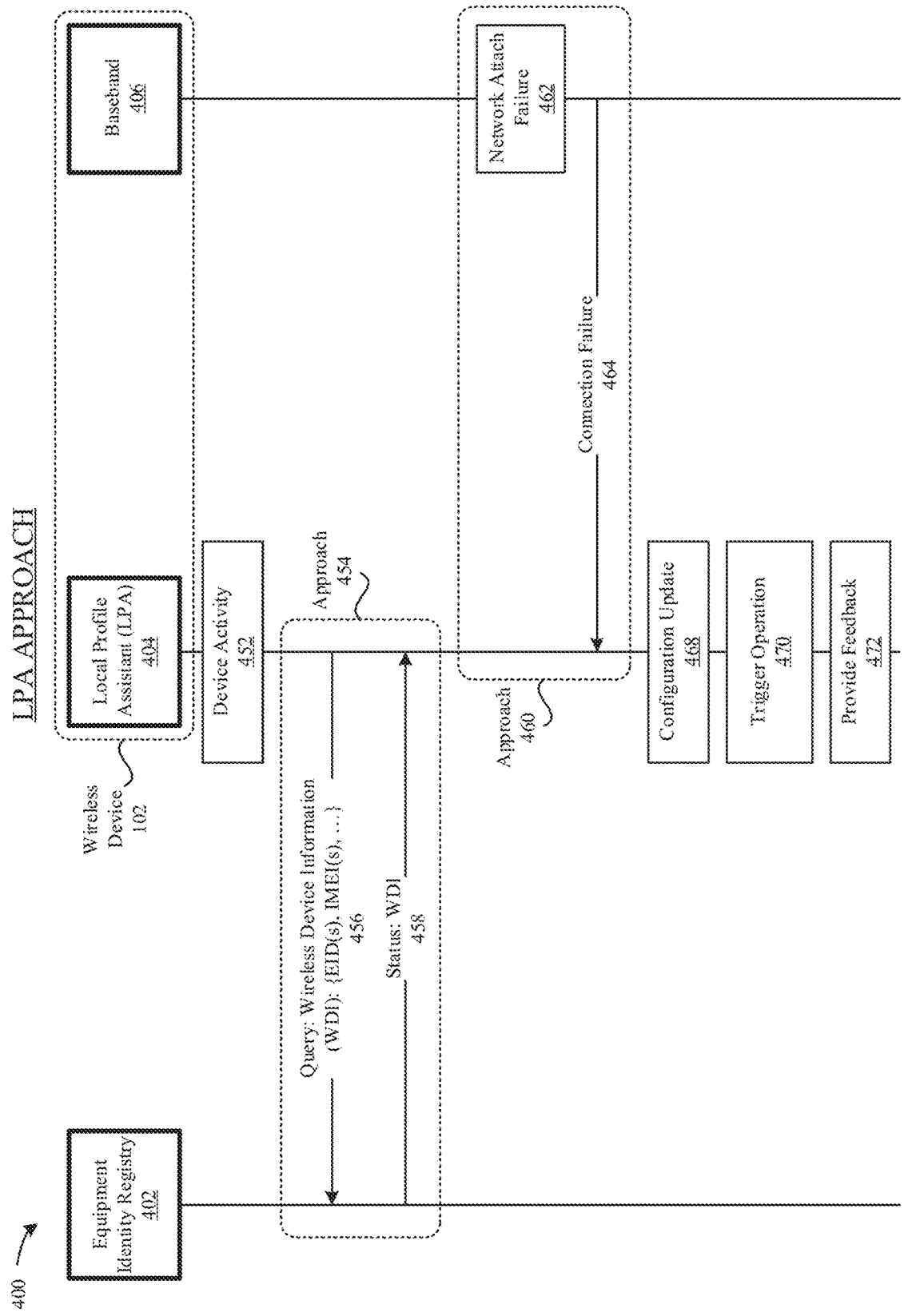
FIG. 4 illustrates a sequence diagram of a second (local profile assistant (LPA) centric) technique for interacting with a wireless device that has been flagged due to certain activity, according to some embodiments.

FIG. 4 illustrates a sequence diagram 400 of a second technique for interacting with a wireless device 102 that has been flagged due to certain activity, according to some embodiments. As shown in FIG. 4, the technique can primarily be implemented by a wireless device 102 particularly, a local profile assistant (LPA) 404 included in the wireless device 102. Under this approach, the LPA 404 can interact with a baseband 406 (e.g., the baseband wireless circuitry 110 of FIG. 2) instead of the ISD-R 308 discussed above in conjunction with FIG. 3. Moreover, the LPA 404 can interact with equipment identity registries 402 (e.g., the equipment identity registries 120 of FIG. 1) instead of interfacing with an SM-DP+ server (such as the SM-DP+ server 304 discussed above in conjunction with FIG. 3). In this regard, and, according to some embodiments, the LPA 404 can communicate with the equipment identity registry 402 (and vice versa) using any conceivable connectivity techniques, e.g., using a Wi-Fi connection with access to the Internet, using a cellular data connection provided by an MNO, and so on.

As shown in FIG. 4, the sequence diagram 400 begins at step 452, which can involve some form of activity taking place at the wireless device 102. For example, the activity can include an initial power-on of the wireless device 102 (and, by extension, an initial power-on of the LPA 404 and the baseband 406). In another example, the activity can include the wireless device 102 transitioning out of an airplane mode (or equivalent) such that the components within the wireless device 102 are re-initializing into an operating state. In yet another example, the activity can include the wireless device 102 processing a software update that causes one or more components of the wireless device 102 (or the wireless device 102 itself) to reboot. It is noted that the foregoing examples are not meant to be limiting, and that step 452 can represent any activity on the wireless device 102 without departing from the scope of this disclosure. Moreover, it is noted that step 452 can be optional. For example, the remaining steps of the sequence diagram 400 can be carried out on a periodic basis, on a direct request (e.g., from a user or other entity) basis, and so on. Next, two different approaches-approach 454 or approach 460—can be used as sequence 400 progresses.

As shown in FIG. 4, approach 454 involves a step 456 where the LPA 404 issues, to the equipment identity registry 402, wireless device information associated with the wireless device 102. As discussed above, such information can include any conceivable information that effectively enables the equipment identity registry 402 to determine whether the wireless device 102 (or some component thereof) has been flagged due to certain activity. Such information can include, for example, IMEIs of the wireless device 102, EIDs of eUICCs 108 included in the wireless device 102, and so on. In turn, at step 458, the equipment identity registry 402 can utilize the same techniques (or techniques similar to those) described above in conjunction with step 362 of FIG. 3 to identify whether the wireless device 102 (or some component thereof) has been flagged due to certain activity. Under any approach used, the equipment identity registry 402 ultimately returns, to the LPA 404, a status message that indicates whether the wireless device 102—at least according to the equipment identity registry 402—is a device of concern.

Alternatively, approach 460 involves the baseband 406 experiencing a network attach failure at step 462. This can occur, for example, when the MNO to which the wireless device 102 is attempting to attach determines that the wireless device 102 has been flagged and refuses to allow the attachment to proceed. Such a scenario typically involves the MNO receiving, from the baseband 406, a request to attach, where the request includes at least one identifier associated with the wireless device 102. In turn, the MNO can effectively determine whether the wireless device 102 has been flagged due to certain activity, e.g., by referencing its own internal management system, by interfacing with equipment identity registries 120, and so on. In any case, at step 464 the baseband 406 can inform the LPA 404 that a connection failure has occurred, which conveys to the LPA 404 that the wireless device has been flagged for certain activity.

Accordingly, regardless of whether approach 454 or 460 is utilized, the LPA 404 is ultimately informed that the MNO (to which the wireless device 102 is attempting to interface) has identified that the wireless device 102 has been flagged and therefore will not be permitted to access wireless services provided by the MNO.

In turn, at step 468, the LPA 404 can update any configuration(s) of the wireless device 102 to effectively prevent the wireless device 102 from attempting to perform any number of activities that would be wasteful given the wireless device 102 has been flagged. For example, the configuration of the wireless device 102 can be updated such that the wireless device 102 will not make any additional attempts to attach to MNOs. The configuration of the wireless device 102 can also be updated such that the wireless device 102 will prohibit eSIM profile-based activities, such as downloading new profiles, modifying existing profiles, deleting existing profiles, and so on. It is noted that the foregoing activities are exemplary and not meant to represent an exhaustive list. On the contrary, the configuration updates discussed herein can target any activity that would be desirable to modify/prohibit on the wireless device 102 when the wireless device 102 is identified by an equipment identity registry 120 as a device of concern.

Additionally, it is noted that the configuration updates discussed herein, once applied, can be modified (or reversed) when one or more conditions are satisfied. For example, a given condition can be satisfied when a particular "cool off" period of time that has lapsed. In another example, a given condition be satisfied when the wireless device 102 (or some component thereof) is power cycled. In yet another example, a given condition can be satisfied when either a physical SIM card is removed from and/or inserted into the wireless device 102 or an eSIM profile is toggled (i.e., disabled and enabled). In a further example, a given condition can be satisfied when the wireless device 102 receives a notification that it is no longer flagged as a device of concern. It is noted that the foregoing conditions are not meant to represent an exhaustive list, and that any condition, as well as any combination of conditions, can be implemented to effectively determine when to modify/reverse the configuration updates discussed herein.

Step 470 occurs when a trigger operation is detected, which represents the LPA 404 detecting (or being notified of) activity taking place on the wireless device 102 that violates the configuration update that took place at step 468. For example, the trigger operation can represent the wireless device 102 attempting to download an eSIM profile onto the wireless device 102, the wireless device 102 re-attempting to attach to an MNO despite being flagged as a device interest, or other similar operations. In response, at step 472, wireless device 102 can provide feedback, e.g., through a display device that is communicably attached to the wireless device 102. As discussed above in conjunction with step 366 of FIG. 3, the wireless device 102 can display information indicating the nature of the reason that the wireless device 102 is prohibited from performing the operation detected at step 470. Again, it is noted that any approach can be utilized to maximize a user's understanding of the nature of the problem, including displaying detailed information about the issue itself, detailed suggestions about how to remedy the issue, and so on.

Additionally, it is noted that, in some embodiments, the feedback approach can provide options that permit a user to effectively bypass the configuration update implemented by the wireless device 102 at step 468. For example, when the trigger operation at step 470 involves a user request to download and/or install a new eSIM profile, the wireless device 102 can inform the user that the operation likely will not result in the wireless device 102 successfully attaching to an MNO given the wireless device 102 has been flagged as a device of concern. In another example, when the trigger operation at step 470 involves a user request to attach to the MNO (e.g., using an existing SIM/eSIM profile), the wireless device 102 can warn of a number of failed attachment attempts that have occurred due to the wireless device being flagged as a device of concern, but at the same time enable the user to cause the wireless device 102 to attempt to reattach to the MNO anyway. It is noted that the foregoing examples are not meant to be exhaustive, and that the feedback at step 472 can enable the user to cause any number of operations to be performed in relation to the configuration update and the trigger operation of steps 468 and 470, respectively.

Accordingly, FIG. 4 sets forth an LPA-centric approach for eliminating unnecessary interactions and enabling enhanced user feedback when wireless devices that have been flagged are attempting to interact with MNOs.

Figure 5:
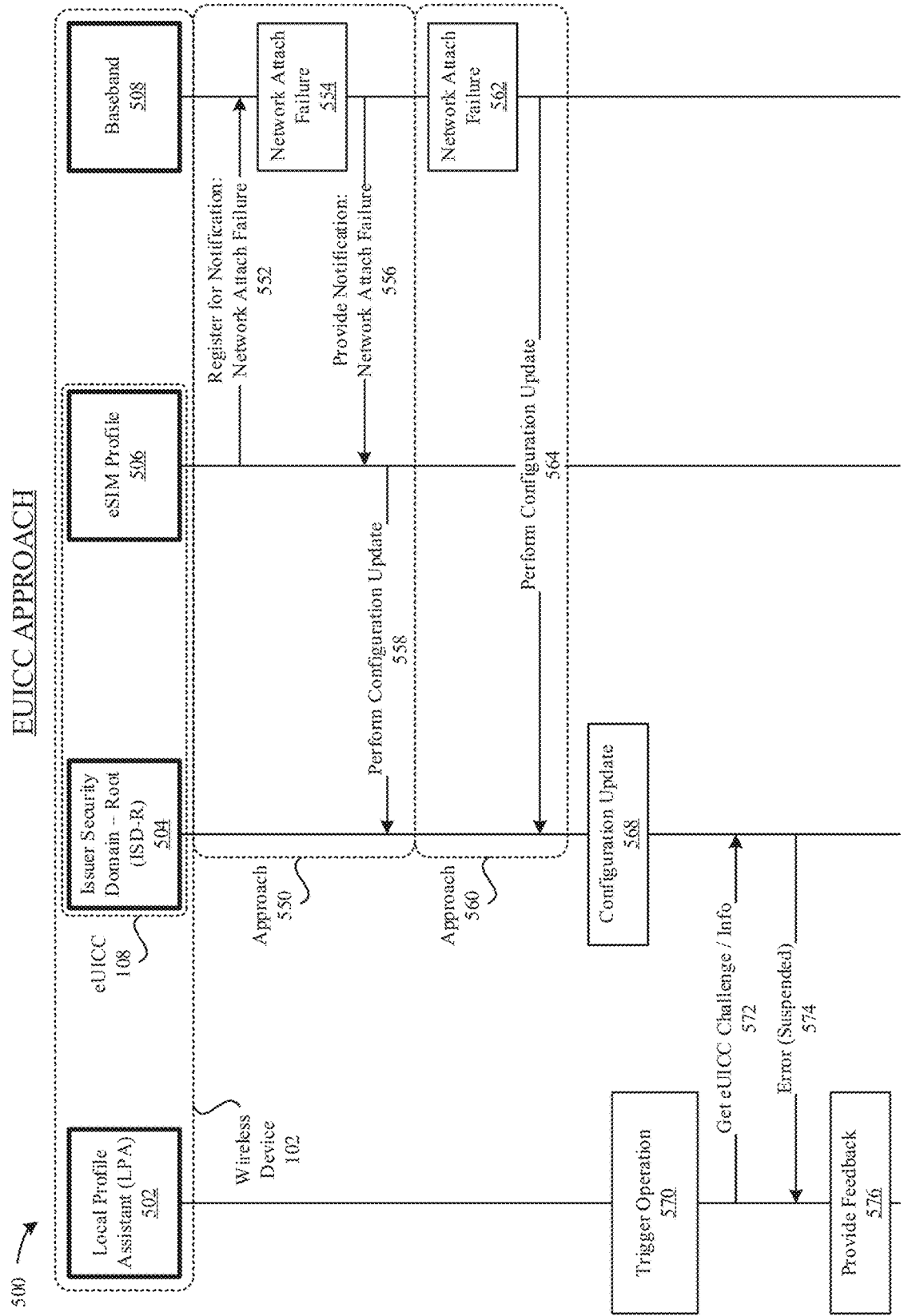
FIG. 5 illustrates a sequence diagram of a third (embedded Universal Integrated Circuit Card (eUICC) centric) technique for interacting with a wireless device that has been flagged due to certain activity, according to some embodiments.

FIG. 5 illustrates a sequence diagram 500 of a third technique for interacting with a wireless device 102 that has been flagged due to certain activity, according to some embodiments. As shown in FIG. 5, the technique can primarily be implemented by a wireless device 102 particularly, an eUICC 108 included in the wireless device 102, which can include an ISD-R 504 and an eSIM profile 506. Under this approach, the eUICC 108 can interact with a baseband 508 (e.g., the baseband wireless circuitry 110 of FIG. 2) as well as an LPA 502. These various entities can communicate with one another using any conceivable connectivity techniques.

As a brief aside—and, although not illustrated in FIG. 5—it is noted that the sequence diagram 500 can begin with some form of activity taking place at the wireless device 102. For example, the activity can include an initial power-on of the wireless device 102 (and, by extension, an initial power-on of the LPA 502, the eUICC 108, and the baseband 508). In another example, the activity can include the wireless device 102 transitioning out of an airplane mode (or equivalent) such that the components within the wireless device 102 are re-initializing into an operating state. In yet another example, the activity can include the wireless device 102 loading the eSIM profile 506 to be used to access wireless services provided by a given MNO. For example, the eSIM profile 506 can represent a bootstrap eSIM profile that permits the wireless device 102 to access limited wireless services in order to connect to MNOs and download other eSIM profiles to access expanded/enhanced wireless services. It is noted that the foregoing examples are not meant to be limiting, and that the sequence diagram 500 can be preceded by any activity on the wireless device 102 without departing from the scope of this disclosure.

As shown in FIG. 5, two different approaches-approach 550 or approach 560—can be utilized as sequence 500 executes. According to some embodiments, approach 550 can involve a step 552 where the eSIM profile 506 issues a request to the baseband 508 to receive one or more notifications when the baseband 508 experiences a network attach failure. As described herein, a network attach failure can occur when the wireless device 102 is prohibited from accessing wireless services provided by an MNO in conjunction with identifying that the wireless device 102 has been flagged due to certain activity. Such a prohibition can occur, for example, using MNO-centric techniques, and/or any of the techniques described herein for identifying scenarios under which the wireless device 102 has been flagged due to certain activity.

Next, within approach 550, the baseband 508 detects a network attach failure at step 554 (which, again, indicates that the wireless device 102 has been flagged due to certain activity). In response—and, because the eSIM profile 506 registered to receive notifications of such an event through step 552—at step 556, the baseband 508 provides, to the eSIM profile 506, a notification of the network attach failure. At this juncture, the eSIM profile 506 is aware that the network attach failure has occurred (and that the wireless device 102 has been flagged). Accordingly, at step 558, the eSIM profile 506 interfaces with the ISD-R 504 to cause the ISD-R 504 to perform a configuration update that effectively prevents the wireless device 102 from attempting to perform any number of activities that would be wasteful given the wireless device 102 has been flagged. This can include, for example, a request to suspend profile-related activities on the wireless device 102 until at least one condition is satisfied. Such a configuration update takes place at step 568, which is discussed below in greater detail.

Alternatively, approach 560 omits the eSIM profile 506 registering to receive a network attach failure notification from the baseband 508 (as described above in conjunction with step 552 under the approach 550). Instead, the baseband 508 can be configured (e.g., in advance) to notify the ISD-R 504 of any network attach failures that the baseband 508 experiences. This approach can be useful, for example, when the wireless device 102 is not in possession of any eSIM profiles and is attempting to interface with an MNO (or other entity) to download an eSIM profile to access wireless services. In any case, the baseband 508 is aware that the network attach failure has occurred (and that the wireless device 102 has been flagged). Accordingly, at step 564, the baseband 508 interfaces with the ISD-R 504 to cause the ISD-R 504 to perform a configuration update that effectively prevents the wireless device 102 from attempting to perform any number of activities that would be wasteful given the wireless device 102 has been flagged. Again, this can include, for example, a request to suspend profile-related activities on the wireless device 102 until at least one condition is satisfied. Such a configuration update takes place at step 568, which is discussed below in greater detail.

At step 568, the ISD-R 504 can update any configuration(s) of the wireless device 102 to effectively prevent the wireless device 102 from attempting to perform any number of activities that would be wasteful given the wireless device 102 has been flagged. For example, the configuration of the wireless device 102 can be updated such that the wireless device 102 will not make any additional attempts to attach to MNOs. The configuration of the wireless device 102 can also be updated such that the wireless device 102 will prohibit eSIM profile-based activities, such as downloading new profiles, modifying existing profiles, deleting existing profiles, and so on. It is noted that the foregoing activities are exemplary and not meant to represent an exhaustive list. On the contrary, the configuration updates discussed herein can target any activity that would be desirable to modify/prohibit on the wireless device 102 when the wireless device 102 is being tracked by an equipment identity registry 120.

It is noted that although the sequence diagram 500 involves the ISD-R 504 performing the configuration update, other entities included within the wireless device 102 can perform the configuration updates without departing from the scope of this disclosure. For example, the ISD-R 504 can interface with the LPA 502 to perform some or all of the configuration update that takes place at step 568 (e.g., as described above in conjunction with step 468 of FIG. 4). Additionally, and as previously described herein, applied configuration updates can be modified (or reversed) by the ISD-R 504, the LPA 502, or any other appropriate/capable entity within the wireless device 102 when one or more conditions are satisfied.

Step 570 occurs when a trigger operation is detected, which represents the LPA 502 detecting (or being notified of) activity taking place on the wireless device 102 that, if permitted, would be violative of the configuration updates that were implemented at step 568. The trigger operations can include, for example, those described above in conjunction with steps 352 and 470 of FIGS. 3 and 4, respectively.

In response, at step 572, the LPA 502 issues a request to the ISD-R 504 for information associated with the eUICC 108 and/or a challenge-based response from the eUICC 108. According to some embodiments, the request for information associated with the eUICC 108 can be facilitated using the ES10b "GetEUICCChallenge" function defined by the GSM Association (GSMA), whereas the request for the challenge-based response from the eUICC 108 can be facilitated using the ES10b "GetUICCInfo" function also defined by the GSMA. It is noted that the utilization of the foregoing ES10b function(s) at step 572 constitutes one example approach and is not meant to be limiting. On the contrary, any approach can be utilized to enable LPA 502 and the ISD-R 504 to communicate information between one another without departing from the scope of this disclosure.

In any case, at step 574, the ISD-R 504 can indicate to the LPA 502 that the configuration update that took place in conjunction with step 568 effected a suspension of profile-related activities on the wireless device 102 until at least one condition is satisfied.

At step 576, the wireless device 102 can provide feedback, e.g., through a display device that is communicably attached to the wireless device 102. As discussed above in conjunction with step 366 and 472 of FIGS. 3 and 4, respectively, the wireless device 102 can display information indicating the nature of the reason that the wireless device 102 is prohibited from performing the operation detected at step 570. Again, it is noted that any approach can be utilized to maximize a user's understanding of the nature of the problem, including displaying detailed information about the issue itself, detailed suggestions about how to remedy the issue, and so on. Moreover, and as previously described herein, the feedback approach can provide options that permit a user to effectively bypass the configuration update implemented by the wireless device 102 at step 568.

Accordingly, FIG. 5 sets forth an eUICC-centric approach for eliminating unnecessary interactions and enabling enhanced user feedback when wireless devices that have been flagged are attempting to interact with MNOs.

It is noted that the sequence diagrams 300, 400, and 500 discussed above in conjunction within FIGS. 3, 4, and 5, respectively, are not required to be implemented in isolation. On the contrary, any number of these approaches, in part or in whole, as well as alone or in combination, can be implemented to achieve desired results (with respect to managing wireless devices 102 that have been flagged by the equipment identity registries 120) without departing from the scope of this disclosure.

Figure 6:
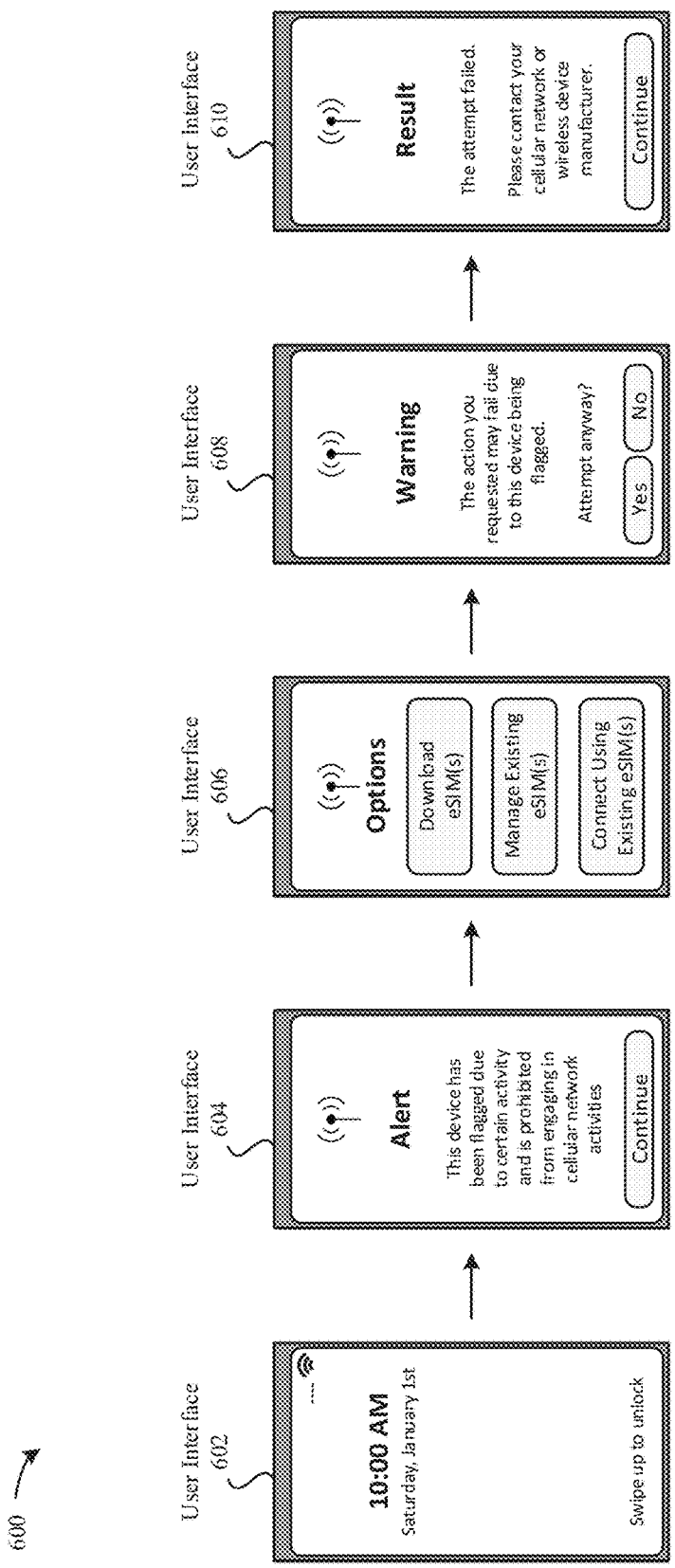
FIG. 6 illustrates a conceptual diagram of exemplary user interfaces that can be displayed by a wireless device that has been flagged due to certain activity, according to some embodiments.

FIG. 6 illustrates a conceptual diagram 600 of exemplary user interfaces that can be displayed by a wireless device 102 that has been flagged due to certain activity, according to some embodiments. As shown in FIG. 6, the wireless device 102 can display a user interface 602, which can constitute, for example, a lock screen or a welcome screen of the wireless device 102. In particular, the user interface 602 can be displayed subsequent to the wireless device 102 executing one or more steps of FIGS. 3, 4, and/or 5, in which the wireless device 102 effectively identifies/determines that it has been flagged due to certain activity. For example, the user interface 602 can be displayed after the wireless device 102 performs steps 352-364 of FIG. 3, steps 452-470 of FIG. 4, and/or steps 550-574 of FIG. 5. As shown in FIG. 6, the user interface 602 can indicate established connectivity, such as bars that represent an overall strength of a cellular network connection (if any), a Wi-Fi icon that indicates a Wi-Fi connection (if any), and so on. In the example illustrated in FIG. 6, the user interface 602 shows empty cellular network connection bars because the wireless device 102 has identified/determined that it has been flagged due to certain activity and therefore is not permitted to access wireless services provided by an MNO.

A next user interface 604 can be displayed in response to, for example, a user providing the appropriate input(s) to advance to the next user interface 604. As shown in FIG. 6, the user interface 604 can convey to a user of the wireless device 102 that the wireless device 102 has been flagged due to certain activity and is therefore prohibited from engaging in cellular network activities. In this regard, the user interface 604 can represent, for example, the feedback steps 366, 472, and 576 described above in conjunction with FIGS. 3, 4, and 5, respectively. Additionally, and as previously described herein, the user may be presented with one or more options to select in response to the notification.

A next user interface 606 can be displayed in response to the user selecting to continue after receiving the notification displayed in the user interface 604. As shown in FIG. 6, the user interface 606 can enable the user to select from a variety of options that constitute cellular network activities desired by the user. Such activities can include, for example, downloading eSIM profiles onto the wireless device 102, performing management operations on existing eSIM profiles installed on the wireless device 102, attempting to connect to one or more MNOs using existing eSIM profiles installed on the wireless device 102, and so on. It is noted that the foregoing activities do not constitute an exhaustive list of options, and that any number of user interfaces can be provided to permit the user to attempt to invoke any form of cellular network (or other) activities without departing from the scope of this disclosure.

In any case, when the user selects an option, the wireless device 102 can display a user interface 608 that warns the user that the operation likely will fail because the wireless device 102 has been flagged due to certain activity (e.g., as described above in conjunction with FIG. 4). If the user opts to attempt the operation, then an additional user interface 610 can be displayed to inform the user of the result of the attempt. As shown in FIG. 6, the user interface 610 can inform the user that the operation failed and provide a recommended course of action for remedying the issue. Alternatively (and not illustrated in FIG. 6), the user interface 610 could inform the user that the operation succeeded. Such a result could occur, for example, if the wireless device 102 had been eliminated as a device of concern prior to attempting to perform the operation, in which case the operation would have a chance of succeeding.

It is noted that the user interfaces illustrated in FIG. 6 (and described herein) are merely exemplary and not meant to be limiting in any fashion. On the contrary, any number of user interfaces can be implemented to effectively inform the user of the various issues and procedures described throughout this disclosure without departing from its scope.

Figure 7:
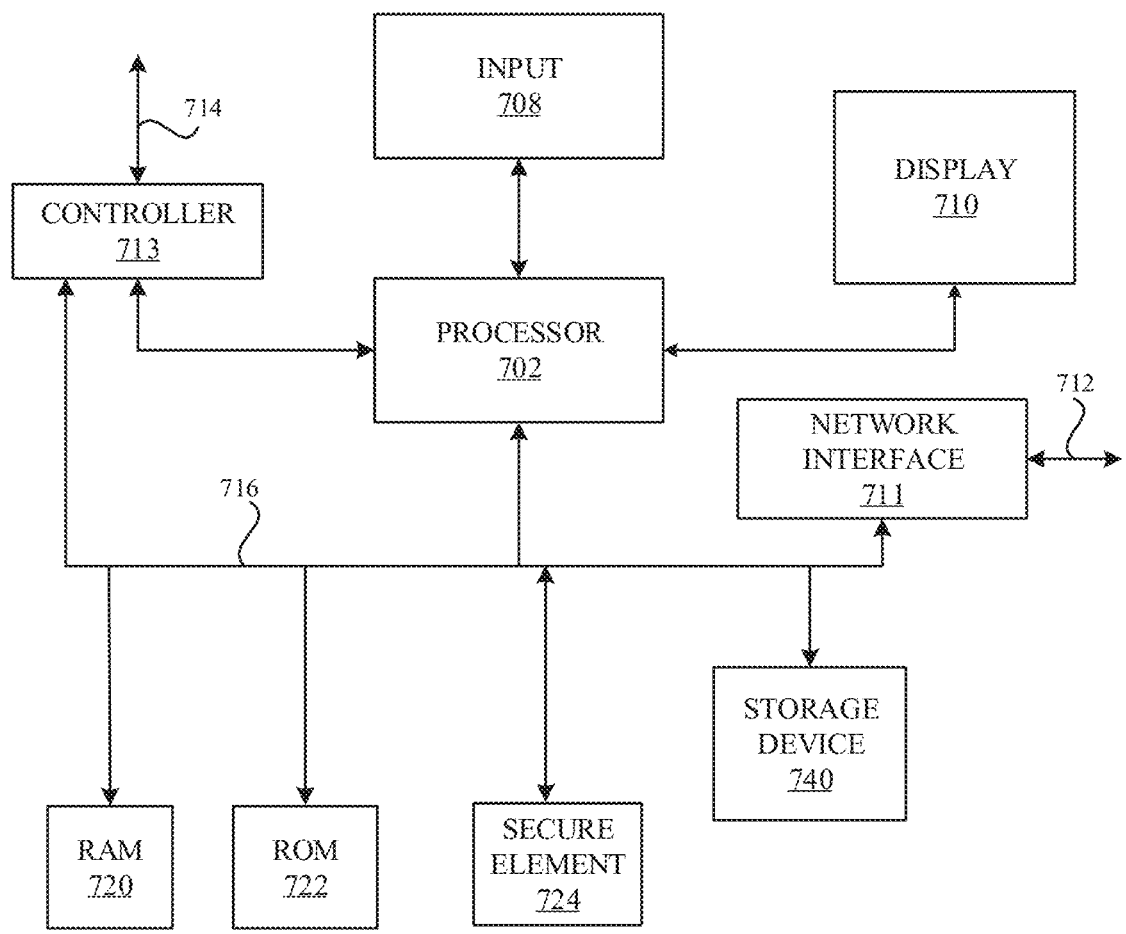
FIG. 7 illustrates a block diagram of exemplary elements of a mobile wireless device, according to some embodiments.

FIG. 7 illustrates a detailed view of a representative computing device 700 that can be used to implement various methods described herein, according to some embodiments. In particular, the detailed view illustrates various components that can be included in a wireless device 102. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 that can be controlled by the processor 702 to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that communicatively couples to a data link 712. In the case of a wireless connection, the network/bus interface 711 can include a wireless transceiver.

The computing device 700 also includes a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700. The computing device 700 can further include a secure element (SE) 724, such as an eUICC 108, a UICC 118, or another secure storage for cellular wireless system access by a wireless device 102.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High-Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for interacting with a wireless device that has been flagged due to certain activity, the method comprising, at a Subscription Manager—Data Preparation Plus (SM-DP+) server:
   receiving, from a local profile assistant (LPA) of the wireless device, a client authentication request, wherein the client authentication request includes at least one unique identifier associated with the wireless device;
   providing the at least one unique identifier to an equipment identity registry, wherein the equipment identity registry manages unique identifiers of devices that have been flagged due to certain activity;
   receiving, from the equipment identity registry, a status of the wireless device, wherein the status indicates that the wireless device has been flagged due to certain activity; and
   providing the status of the wireless device to the LPA to cause the wireless device to update its configuration so that the wireless device is prohibited from performing at least one form of cellular network activity.

2. The method of claim 1, wherein the client authentication request is provided by the LPA in response to the LPA receiving, from an issuer security domain root (ISD-R) entity of the wireless device, the at least one unique identifier.

3. The method of claim 2, wherein:
   the ISD-R generates a digital signature based on the at least one unique identifier prior to providing the at least one unique identifier to the LPA, and
   the LPA authenticates the digital signature prior to providing the at least one unique identifier to the SM-DP+ server.

4. The method of claim 1, wherein the status of the wireless device comprises at least one status code that indicates the wireless device has been flagged due to certain activity.

5. The method of claim 4, wherein the at least one status code corresponds to an international mobile equipment identity (IMEI) of the wireless device or an identifier (EID) of an embedded Universal Integrated Circuit Card (eUICC) of the wireless device.

6. The method of claim 1, wherein, prior to providing the client authentication request, the LPA identifies a trigger operation that causes the wireless device to require indication as to whether the wireless device has been flagged due to certain activity.

7. The method of claim 6, wherein the trigger operation comprises:
   a power-on of the wireless device,
   a first request to download an electronic subscriber identity module (eSIM) profile to the wireless device,
   a second request to perform at least one management operation on at least one eSIM profile managed by the wireless device, and/or
   a third request to connect to a mobile network operator (MNO) using at least one eSIM profile managed by the wireless device.

8. The method of claim 1, wherein the certain activity comprises any combination of:
   the at least one unique identifier being shared by a separate and distinct wireless device that has attempted to interact with an MNO, or
   the wireless device being reported as lost or misappropriated.

9. A method for interacting with a wireless device that has been flagged due to certain activity, the method comprising, at a local profile assistant (LPA) of the wireless device:
   obtaining at least one unique identifier associated with the wireless device;
   providing the at least one unique identifier to an equipment identity registry, wherein the equipment identity registry manages unique identifiers of devices that have been flagged due to certain activity; and
   in response to receiving, from the equipment identity registry, a status of the wireless device, wherein the status indicates that the wireless device has been flagged due to certain activity:
   updating a configuration of the wireless device so that the wireless device is prohibited from performing at least one form of cellular network activity.

10. The method of claim 9, further comprising, subsequent to updating the configuration:
   detecting a trigger operation that comprises activity selected from one or more of:
   a first request to download an electronic subscriber identity module (eSIM) profile to the wireless device,
   a second request to perform at least one management operation on at least one eSIM profile managed by the wireless device, and/or
   a third request to connect to a mobile network operator (MNO) using at least one eSIM profile managed by the wireless device.

11. The method of claim 10, further comprising, in response to the trigger operation:
prohibiting the activity from occurring.

12. The method of claim 10, further comprising, prior to obtaining the at least one unique identifier, identifying device activity at the wireless device, wherein the device activity comprises:
a power-on of the wireless device; or
a transition out of an airplane mode on the wireless device.

13. The method of claim 10, further comprising:
displaying a user interface that conveys that the wireless device has been flagged due to certain activity.

14. The method of claim 10, further comprising, subsequent to updating the configuration:
receiving an indication that the wireless device is no longer flagged, and
reverting the updates made to the configuration.

15. An apparatus for interacting with a wireless device that has been flagged due to certain activity, the apparatus comprising a processor coupled to a memory storing instructions, wherein the apparatus is configured at the wireless device to:
obtain at least one unique identifier associated with the wireless device;
provide the at least one unique identifier to an equipment identity registry, wherein the equipment identity registry manages unique identifiers of devices that have been flagged due to certain activity; and
in response to receiving, from the equipment identity registry, a status of the wireless device, wherein the status indicates that the wireless device has been flagged due to certain activity:
update a configuration of the wireless device so that the wireless device is prohibited from performing at least one form of cellular network activity.

16. The apparatus of claim 15, wherein the apparatus is further configured to, subsequent to updating the configuration:
detect a trigger operation that comprises activity selected from one or more of:
a first request to download an electronic subscriber identity module (eSIM) profile to the wireless device,
a second request to perform at least one management operation on at least one eSIM profile managed by the wireless device, and/or
a third request to connect to a mobile network operator (MNO) using at least one eSIM profile managed by the wireless device.

17. The apparatus of claim 16, wherein the apparatus is further configured to, in response to the trigger operation:
prohibit the activity from occurring.

18. The apparatus of claim 16, wherein the apparatus is further configured to, prior to obtaining the at least one unique identifier, identify device activity at the wireless device, wherein the device activity comprises:
a power-on of the wireless device; or
a transition out of an airplane mode on the wireless device.

19. The apparatus of claim 16, wherein the apparatus is further configured to, subsequent to updating the configuration:
receive an indication that the wireless device is no longer flagged, and
revert the updates made to the configuration.

* * * * *